United States Patent
Omi (10) Patent No.: US 9,367,901 B2
(45) Date of Patent: Jun. 14, 2016

(54) IMAGE PROCESSING APPARATUS AND IMAGE PROCESSING METHOD TO GENERATE IMAGES BASED ON ADJUSTED GAIN COEFFICIENTS

(71) Applicant: CANON KABUSHIKI KAISHA, Tokyo (JP)

(72) Inventor: Hiroyuki Omi, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/375,747

(22) PCT Filed: Jan. 23, 2013

(86) PCT No.: PCT/JP2013/051943
§ 371 (c)(1),
(2) Date: Jul. 30, 2014

(87) PCT Pub. No.: WO2013/115199
PCT Pub. Date: Aug. 8, 2013

(65) Prior Publication Data
US 2015/0010250 A1    Jan. 8, 2015

(30) Foreign Application Priority Data
Feb. 1, 2012    (JP) ................................ 2012-020223

(51) Int. Cl.
*G06K 9/40* (2006.01)
*G06T 5/00* (2006.01)
*G06T 5/10* (2006.01)

(52) U.S. Cl.
CPC .................. *G06T 5/002* (2013.01); *G06T 5/003* (2013.01); *G06T 5/10* (2013.01);
(Continued)

(58) Field of Classification Search
None
See application file for complete search history.

(56) References Cited

U.S. PATENT DOCUMENTS 5,144,686 A * 9/1992 Yumiba ..................... G06T 5/20
                                                      358/447
5,467,404 A * 11/1995 Vuylsteke ............... G06T 5/007
                                                      382/128

(Continued)

FOREIGN PATENT DOCUMENTS

| CN | 2838185 Y | 11/2006 |
| JP | H09-248291 A | 9/1997 |
| JP | 2005-296331 A | 10/2005 |

OTHER PUBLICATIONS

Vuylsteke P et al: "Image Processing in Computed Radiography;" Computerized Tomography for Industrial Applications and Image Processing in Radiology; Mar. 15-17, 1999, Berlin, Germany; pp. 1-16; XP-002313672.

*Primary Examiner* — Feng Niu
(74) *Attorney, Agent, or Firm* — Canon USA, Inc. IP Division (57) ABSTRACT

An image processing apparatus includes a frequency component generation unit, a coefficient acquisition unit, a detection unit, a gain adjustment unit, and a processed image generation unit. The frequency component generation unit is configured to generate a plurality of frequency component images based on an original image. The coefficient acquisition unit is configured to acquire a gain coefficient for gain correction. The detection unit is configured to detect edge information based on the gain coefficient. The gain adjustment unit is configured to adjust a gain of at least one of the plurality of frequency component images based on the gain coefficient and the edge information. The processed image generation unit is configured to generate a processed image based on at least one of the plurality of frequency component images with the gain adjusted by the gain adjustment unit.

9 Claims, 6 Drawing Sheets

(52) U.S. Cl.
CPC ............... *G06T 2207/10116* (2013.01); *G06T 2207/20016* (2013.01); *G06T 2207/20182* (2013.01); *G06T 2207/20192* (2013.01)

(56) References Cited

U.S. PATENT DOCUMENTS

| | | | | |
|---|---|---|---|---|
| 5,937,111 | A * | 8/1999 | Yamada | G06T 5/004 382/132 |
| 5,963,676 | A * | 10/1999 | Wu | G06T 5/002 382/263 |
| 6,591,017 | B1 * | 7/2003 | Fukuhara | H04N 19/122 375/240.19 |
| 6,788,826 | B1 | 9/2004 | Van De Velde et al. | |
| 7,298,404 | B2 * | 11/2007 | Shimazaki | H04N 5/208 348/222.1 |
| 7,352,396 | B2 * | 4/2008 | Okada | H04N 5/208 348/222.1 |
| 7,405,770 | B1 * | 7/2008 | Gudmunson | H04N 5/21 348/470 |
| 7,406,208 | B2 * | 7/2008 | Chiang | G06T 5/003 382/199 |
| 7,483,081 | B2 * | 1/2009 | Wu | H04N 5/783 348/625 |
| 7,782,401 | B1 * | 8/2010 | Chou | G06T 3/403 348/581 |
| 7,822,256 | B2 * | 10/2010 | Couwenhoven | G06T 5/004 382/132 |
| 7,840,089 | B2 * | 11/2010 | Ho | G06T 5/004 382/263 |
| 8,139,890 | B2 * | 3/2012 | Huang | G06T 5/002 382/195 |
| 8,502,894 | B2 * | 8/2013 | Chiang | H04N 5/208 348/252 |
| 2007/0003156 | A1 * | 1/2007 | Lin | G06T 5/002 382/260 |
| 2008/0170158 | A1 * | 7/2008 | Jung | G06T 5/50 348/581 |
| 2009/0180030 | A1 * | 7/2009 | Shin | H04N 9/77 348/663 |

* cited by examiner

| GAIN COEFFICIENT VALUE α | EDGE DETECTION METHOD |
|---|---|
| 0.0 TO 1.0 | MOMENT OPERATOR |
| 1.0 TO 1.2 | PERCENTILE FILTER |
| 1.2 TO 1.5 | CANNY FILTER |
| 1.5 TO 2.0 | SOBEL OPERATOR |

IMAGE PROCESSING APPARATUS AND IMAGE PROCESSING METHOD TO GENERATE IMAGES BASED ON ADJUSTED GAIN COEFFICIENTS

TECHNICAL FIELD

The present invention relates to an image processing apparatus and an image processing method for emphasizing or suppressing a predetermined frequency component in an image signal.

BACKGROUND ART

A number of image processing techniques for performing frequency emphasis to improve the radiographic image diagnostic performance have been proposed. Frequency emphasis or suppression is performed by generating a plurality of band-limited images representing frequency components in a certain limited frequency band based on an original image, and then emphasizing or suppressing frequency components for each band-limited image. Methods for generating a plurality of band-limited images utilize Laplacian pyramid decomposition, wavelet transform, and unsharp masking. For example, when unsharp masking is used, a band-limited image $H_{Lv}$ is represented by formula (1).

[Math. 1]

$$H_{Lv}(x,y) = S_{usLv-1}(x,y) - S_{usLv}(x,y) \quad (1)$$

where $S_{usLv}$ indicates a defocused image.

A defocused image $S_{us0}$ with Lv=0 indicates an original image $S_{org}$. Lv is an index for band-limited images. Generating defocused images having different frequency response characteristics enables acquiring various band-limited images. When a band-limited image having the lowest frequency is referred to as a low-frequency image L, a relation between the low-frequency image L and the original image is represented by formula (2).

[Math. 2]

$$S_{org}(x, y) = \sum_{Lv=1}^{LvMax} H_{Lv}(x, y) + L(x, y) \quad (2)$$

This means that summing up decomposed band-limited images reconstructs the original image. Band-limited images other than the low-frequency image L are referred to as high-frequency images. Applying gain adjustment to high-frequency images by using a gain coefficient α according to formula (3) enables generating images processed through various types of frequency emphasizes or suppressions.

[Math. 3]

$$H'_{Lv}(x,y) = H_{Lv}(x,y) + (\alpha_{Lv} - 1) \times H_{Lv}(x,y) \quad (3)$$

The gain coefficient α is set for each frequency band. Increasing the gain coefficient α enables emphasizing the relevant frequency band component. Decreasing the gain coefficient α enables suppressing the relevant frequency band component. However, emphasis processing based on the constant α causes identical emphasis processing for all components. Specifically, emphasis processing based on the constant α emphasizes not only edge components (target of emphasis) but also noise components, causing a problem that a desired effect of emphasis cannot be acquired. To cope with the problem, there has been discussed a technique for detecting only edge components from high-frequency images and emphasizing edges to acquire an effect of emphasizing only edges (refer to Japanese Patent Application Laid-Open No. 9-248291 and Japanese Patent Application Laid-Open No. 2005-296331). In particular, Japanese Patent Application Laid-Open No. 2005-296331 discusses a technique for decomposing an original image into a plurality of band-limited high-frequency images and performing emphasis processing, i.e., a technique for detecting edges and applying emphasis processing to edges for each frequency band.

SUMMARY OF INVENTION

According to an aspect of the present invention, an image processing apparatus includes a frequency component generation means for generating a plurality of frequency component images based on an original image, a coefficient acquisition means for acquiring a gain coefficient for applying gain correction to at least one of the plurality of frequency component images, a detection means for detecting edge information of at least one of the plurality of frequency component images based on the gain coefficient, a gain adjustment means for adjusting a gain of at least one of the plurality of frequency component images based on the gain coefficient and the edge information, and a processed image generation means for generating a processed image based on at least one of the plurality of frequency component images with the gain adjusted by the gain adjustment means.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
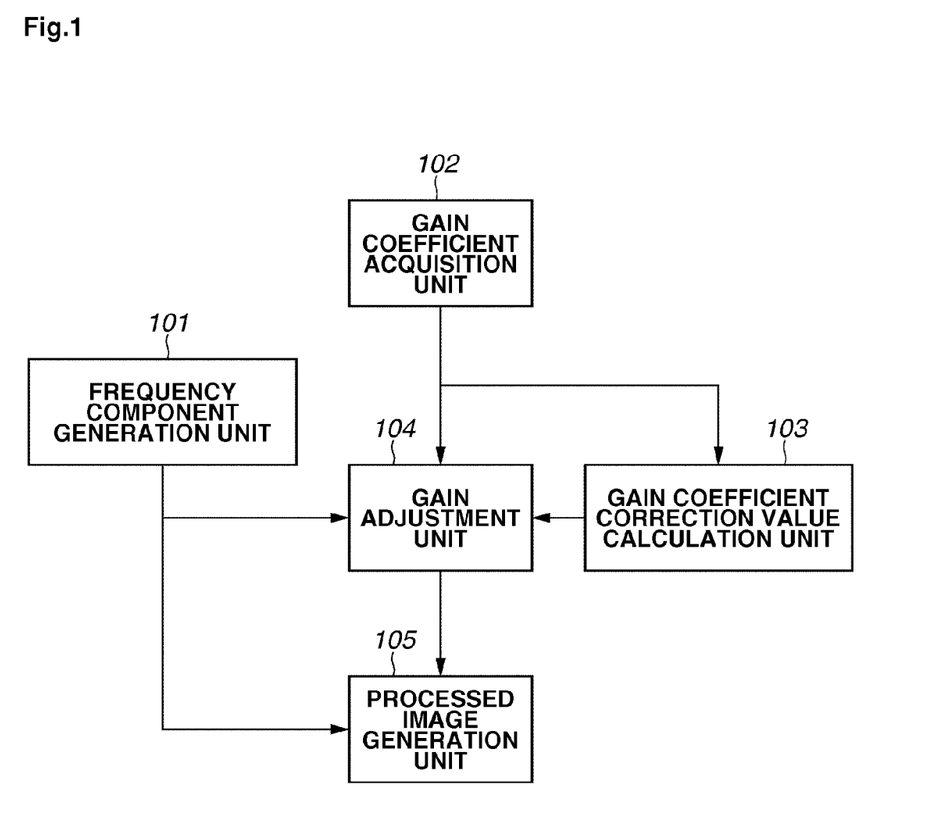
FIG. 1 illustrates an example configuration of an image processing apparatus according to an exemplary embodiment of the present invention.

FIG. 1 illustrates an example configuration of an image processing apparatus according to an exemplary embodiment of the present invention, for example, a configuration of an X-ray image processing apparatus. As illustrated in FIG. 1, the X-ray image processing apparatus includes a frequency component generation unit 101, a gain coefficient acquisition unit 102, a gain coefficient correction value calculation unit 103, a gain adjustment unit 104, and a processed image generation unit 105.

The frequency component generation unit 101 receives an image formed by applying predetermined pre-processing to an X-ray image acquired by an X-ray sensor, generates based on the input image a plurality of high-frequency images and a low-frequency image representing frequency components in a certain limited frequency band, and outputs the generated images. The gain coefficient acquisition unit 102 having user-set frequency response characteristics related to frequency emphasis outputs a gain coefficient required for frequency emphasis processing. The gain coefficient correction value calculation unit 103 receives the gain coefficient output from the gain coefficient acquisition unit 102, calculates a gain coefficient correction value for correcting the gain coefficient, and outputs the calculated gain coefficient correction value. Calculation of the gain coefficient correction value is based on a method for calculating the gain coefficient correction value corresponding to the gain coefficient.

The gain adjustment unit 104 receives the high-frequency images output from the frequency component generation unit 101, the gain coefficient output from the gain coefficient acquisition unit 102, and the gain coefficient correction value output from the gain coefficient correction value calculation unit 103. The gain adjustment unit 104 adjusts the high-frequency images based on the gain coefficient corrected by using the gain coefficient correction value, and outputs the result of the adjustment. The processed image generation unit 105 receives the result of the adjustment of the high-frequency images by the gain adjustment unit 104 and the low-frequency image output from the frequency component generation unit 101, reconstructs an image, and outputs the reconstructed image.

Figure 2:
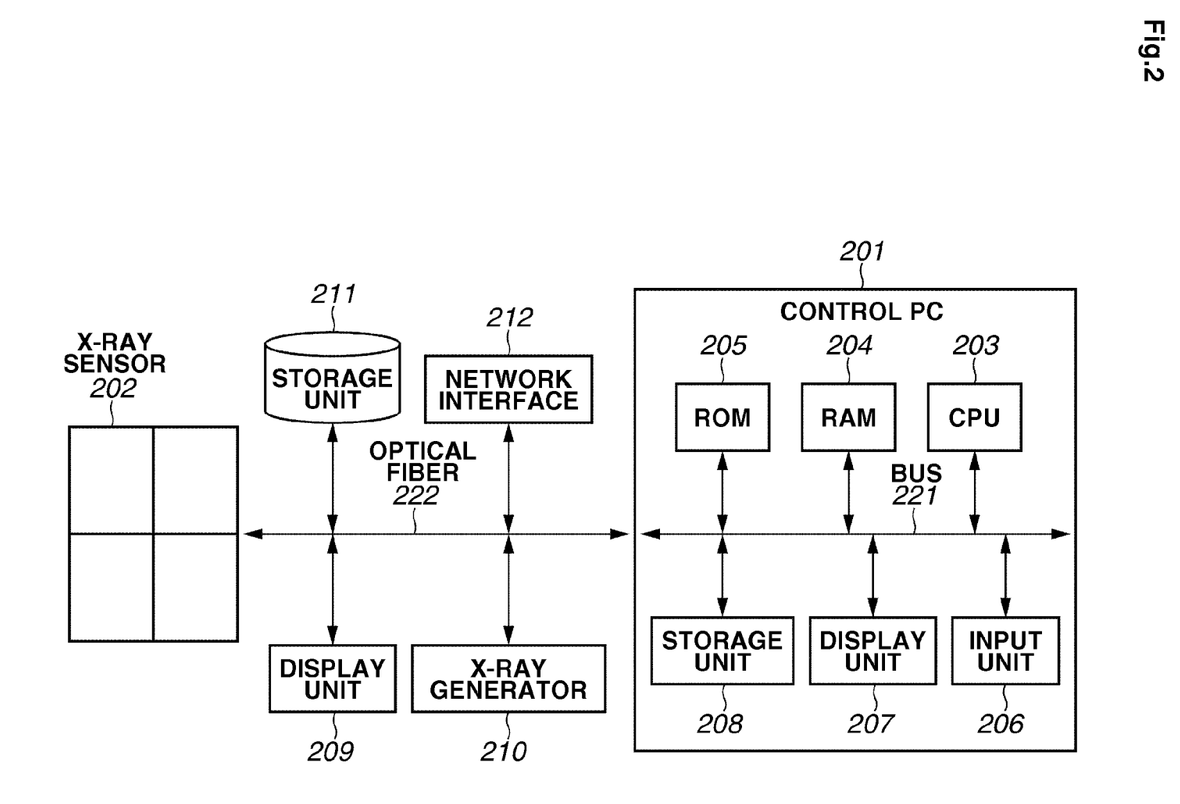
FIG. 2 illustrates computer functions for attaining the image processing apparatus according to the present exemplary embodiment.

FIG. 2 illustrates a case where the image processing apparatus illustrated in FIG. 1 is attained by using a personal computer (PC). A control PC 201, an X-ray sensor 202, and an X-ray generator 210 are connected via an optical fiber 222. The signal line for connecting the control PC 201, the X-ray sensor 202, and the X-ray generator 210 may not be an optical fiber. Further, the control PC 201, the X-ray sensor 202, and the X-ray generator 210 may be connected to be able to communicate with one another via a network such as a Controller Area Network (CAN) and Gigabit Ethernet (registered trademark). A display unit 209, a storage unit 211, and a network interface 212 are connected to the optical fiber 222.

The control PC 201 includes a central processing unit (CPU) 203, a random access memory (RAM) 204, a read only memory (ROM) 205, an input unit 206, a display unit 207, and a storage unit 208. The CPU 203, the RAM 204, the ROM 205, the input unit 206, the display unit 207, and the storage unit 208 are connected to be able to communicate with one another, for example, via a bus 221. A command is sent to the X-ray sensor 202 and the display unit 209 via the control PC 201. In the control PC 201, detailed processing for each photographing mode is stored in the storage unit 208 as software modules. The CPU 203 loads a software module into the RAM 204 and then executes the module based on an instruction from an instruction unit (not illustrated). Although each of the units 101 to 105 illustrated in FIG. 1 is stored in the storage unit 208 as a software module, the present exemplary embodiment is not limited thereto. For example, each of the units 101 to 105 illustrated in FIG. 1 may be implemented as a dedicated image processing board so that optimum implementation is achieved according to the purpose.

X-ray image processing apparatuses according to first to fourth exemplary embodiments will be described in detail below.

A first exemplary embodiment of the present invention will be described below.

Figure 3:
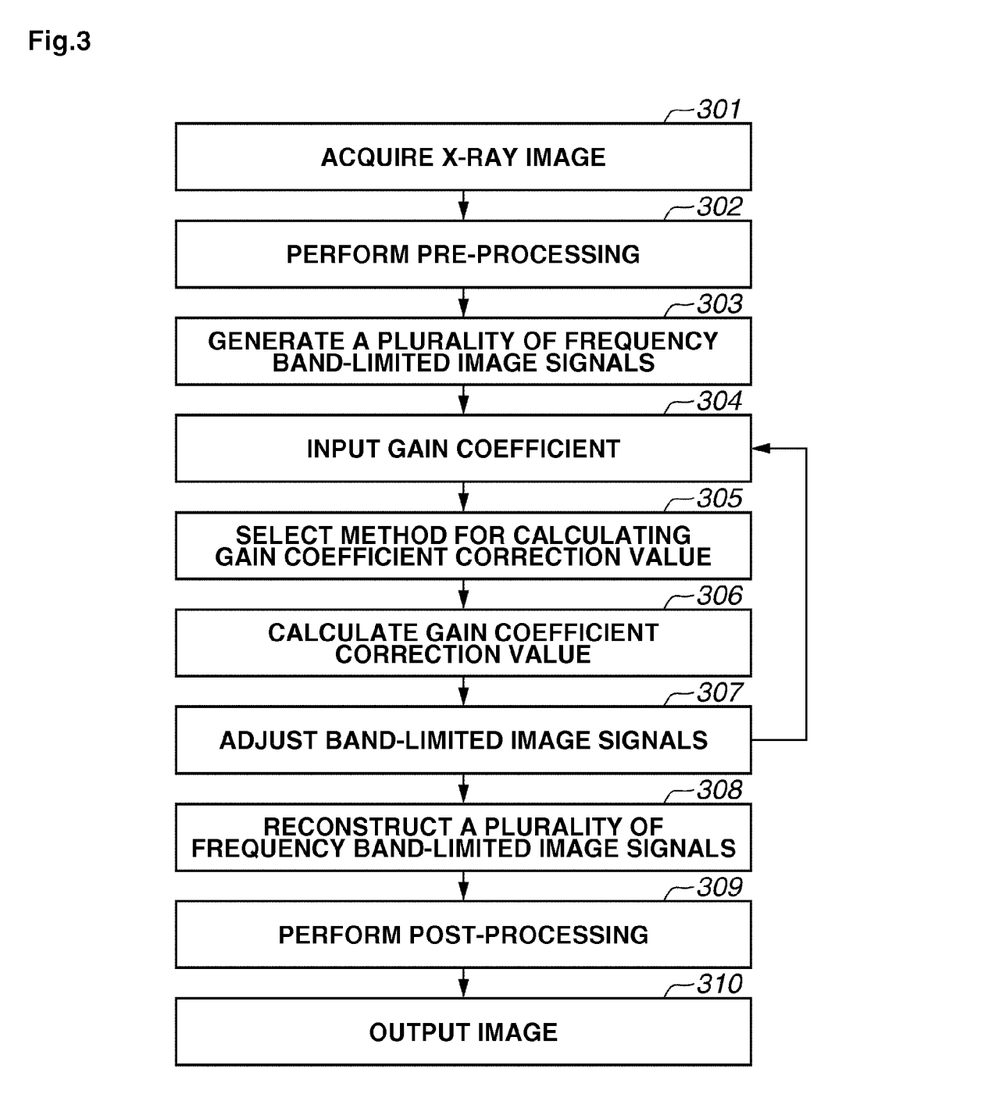
FIG. 3 is a flowchart illustrating processing by the image processing apparatus according to the present exemplary embodiment.

Image processing according to the first exemplary embodiment will be described below with reference to the block diagram illustrated in FIG. 1 and the flowchart illustrated in FIG. 3. In step 301, the CPU 203 acquires an X-ray image by using the X-ray sensor 202.

In step 302, the CPU 203 applies pre-processing to the acquired X-ray image. The pre-processing includes, for example, processing for correcting the characteristics of the X-ray sensor 202, such as offset correction, logarithmic conversion, gain correction, defect correction, etc., and grid fringe suppression processing for suppressing grid moire. As required, processing for improving the signal-to-noise (S/N) ratio such as processing for reducing random noise may be performed as pre-processing.

In step 303, the frequency component generation unit 101 generates a plurality of high-frequency images and a low-frequency image based on the pre-processed original image. Methods for generating band-limited images utilize Laplacian pyramid decomposition and wavelet transform. Although, in the present exemplary embodiment, high-frequency images effectively-acquired through downsampling are limited, at least one high-frequency image is required.

In step 304, the gain coefficient acquisition unit 102 sets the gain coefficient. The value of the gain coefficient is represented by a in formula (3), and is specified for each frequency band by the user. The value of the gain coefficient $\alpha$ may be directly specified by the user or specified by using an automatic conversion method. With this method, a frequency response characteristics generation tool is prepared, frequency response characteristics are generated without being conscious of the gain coefficient $\alpha$, and the frequency response characteristics are automatically converted into the gain coefficient $\alpha$.

In step 305, the gain coefficient correction value calculation unit 103 selects a method for calculating the gain coefficient correction value by using the value of the gain coefficient $\alpha$ specified by the gain coefficient acquisition unit 102. Correcting the gain coefficient refers to reducing the gain coefficient for pixels other than an edge to selectively apply emphasis processing only to edge components in high-frequency images. Therefore, the method for calculating the gain coefficient correction value refers to a method for detecting edge components of high-frequency images and outputting a value for correcting the gain coefficient based on the result of the detection. In the present exemplary embodiment, a plurality of edge detection methods is provided and an edge detection method is selected for each frequency band based on the gain coefficient.

Figure 4A:
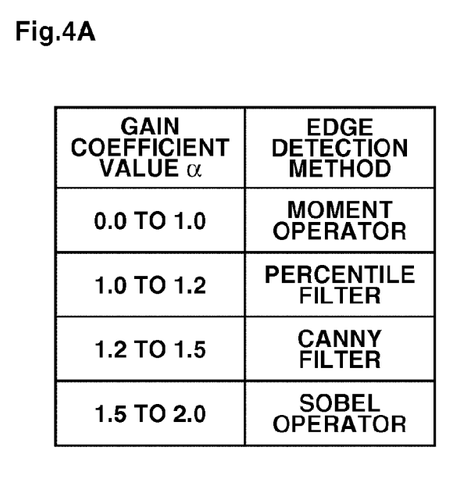
FIGS. 4A, 4B, 4C, and 4D illustrate examples of methods for calculating a gain coefficient correction value according to the present exemplary embodiment.

FIG. 4A illustrates an example of a table for selecting an edge detection method. As illustrated in FIG. 4A, a plurality of edge detection methods with different types of noise immunity is provided. Selection is made in such a way that an edge detection method providing higher noise immunity is selected for a smaller gain coefficient value, thus preventing noise from being erroneously detected as an edge. In the example illustrated in FIG. 4A, with a smaller gain coefficient value, an edge detection method providing higher noise immunity is assigned. Such methods include a moment operator using an integrated value as a feature quantity for edge detection, and a percentile filter providing a threshold in the absolute value of a signal component.

In step 306, the gain coefficient correction value calculation unit 103 outputs a gain coefficient correction value calculated by using an edge detection method selected in processing for selecting a method for calculating the gain coefficient correction value. The result of the edge detection applied to target high-frequency images, i.e., edge information is reflected as the gain coefficient correction value. The edge detection processing may be directly applied to high-frequency images or performed by using an indirect processing method. With this method, the original image $S_{org}$ or the defocused image $S_{us}$ represented by formula (1) is processed and the result of the processing is indirectly used.

Figure 5:
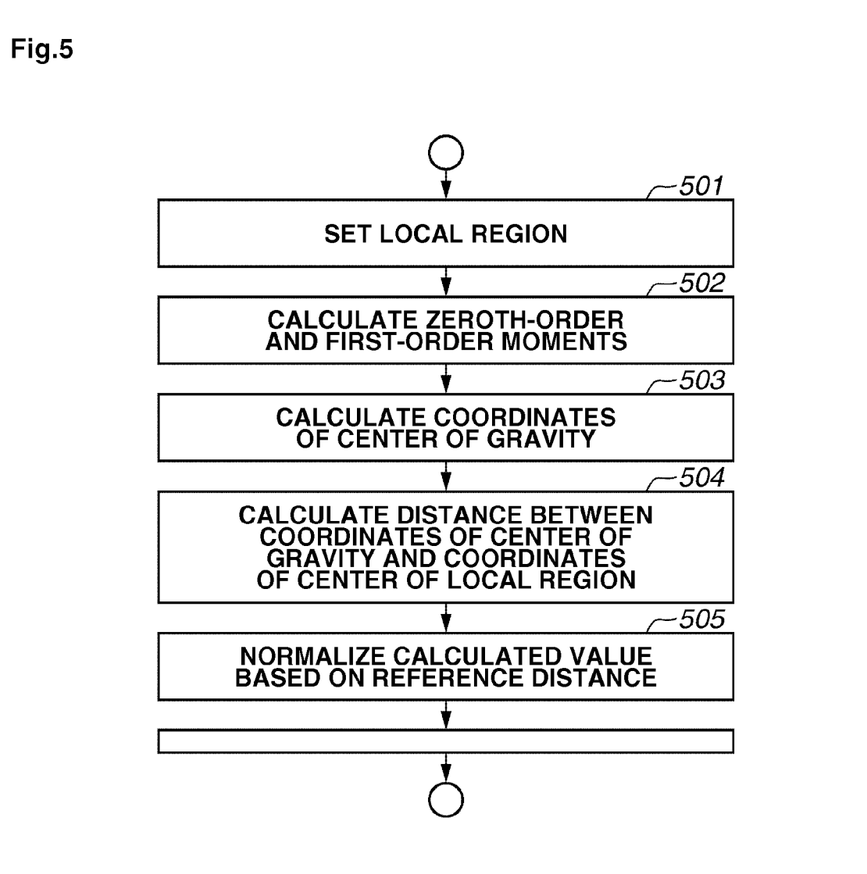
FIG. 5 illustrates an example of edge detection by using a moment operator.

As an edge detection method, a case where the moment operator is selected will be described below with reference to FIG. 5. The method for using the moment operator indirectly applies edge detection of high-frequency images to the original image. In step 501, the gain coefficient correction value calculation unit 103 sets a local region around a pixel subjected to processing. In step 502, the gain coefficient correction value calculation unit 103 calculates zeroth- and first-order moments in the local region. Each moment is calculated by formula (4).

[Math. 4]

$$m_{00} = \sum_x \sum_y S_{org}(x, y) \quad (4)$$
$$m_{10} = \sum_x \sum_y x \cdot S_{org}(x, y)$$
$$m_{01} = \sum_x \sum_y y \cdot S_{org}(x, y)$$

In formula (4), $m_{00}$ indicates the zeroth-order moment, $m_{10}$ indicates the first-order moment in the x direction, and $m_{01}$ indicates the first-order moment in the y direction. In step 503, the gain coefficient correction value calculation unit 103 calculates the coordinates of the center of gravity based on the first-order moment. Since the center of gravity refers to a position in a state of equilibrium of force, the coordinates (gx, gy) can be calculated by formula (5).

[Math. 5]

$$\sum_x \sum_y x \cdot S_{org}(x, y) = \sum_x \sum_y gx \cdot S_{org}(x, y) \quad (5)$$
$$\sum_x \sum_y y \cdot S_{org}(x, y) = \sum_x \sum_y gy \cdot S_{org}(x, y)$$
$$(gx, gy) = \left(\frac{m_{10}}{m_{00}}, \frac{m_{01}}{m_{00}}\right)$$

In step 504, the gain coefficient correction value calculation unit 103 calculates the distance between the coordinates of the center of gravity and the coordinates of the center of the local region by using formula (6).

[Math. 6]

$$\Delta = \sqrt{(cx-gx)^2 + (cy-gy)^2} \quad (6)$$

When an edge exists in the local region, the center of gravity shifts from the center of the local region and therefore the value of Δ calculated by formula (6) increases. Otherwise, when no edge exists in the local region, the center of gravity becomes very close to the center of the local region and therefore the value of Δ calculated by formula (6) decreases. Therefore, the value of Δ calculated by formula (6) serves as a feature quantity for edge detection. Since the value of Δ calculated by formula (6) is an absolute value and difficult to use as it is, the value is normalized last in the present exemplary embodiment. In step 505, the gain coefficient correction value calculation unit 103 normalizes the calculated value of Δ in terms of a reference distance $\Delta_{base}$ to calculate $\Delta_{norm}$ according to formula (7).

[Math. 7]

When $\Delta \leq \Delta_{base}$, $\Delta_{norm} = \Delta/\Delta_{base}$

When $\Delta > \Delta_{base}$, $\Delta_{norm} = 1$ \quad (7)

Figure 6:
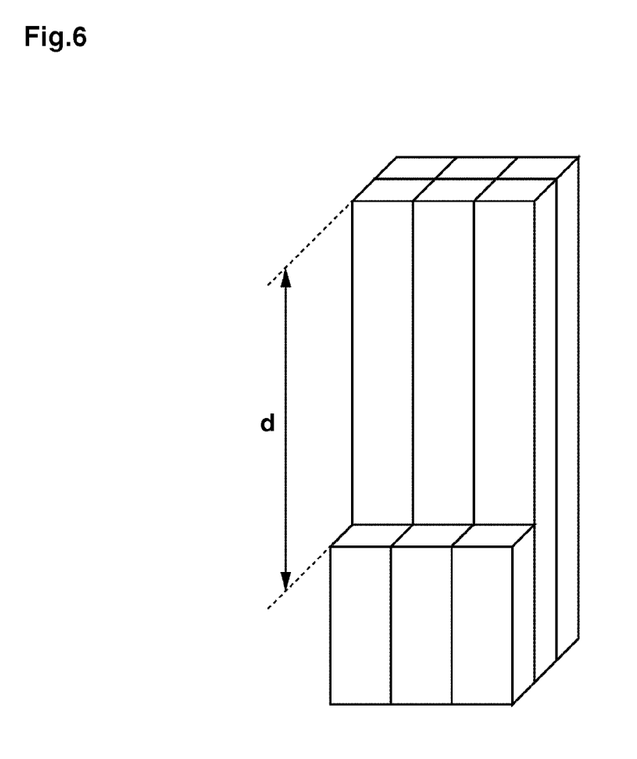
FIG. 6 illustrates a diagram for describing a reference distance.

The reference distance $\Delta_{base}$ is calculated by formula (6) when an edge of a predetermined difference d exists in the local region as illustrated in FIG. 6. Using the edge feature quantity at the predetermined difference d as a reference value means that the predetermined difference d is a target edge. If the value of Δ in each local region calculated by formula (6) is larger than the edge feature quantity, an edge is determined to exist. Otherwise, if the value of Δ is smaller than the edge feature quantity, the probability that an edge exists is determined to be small. Therefore, when the value of $\Delta_{norm}$ normalized in terms of the reference distance $\Delta_{base}$ is 1, the edge detection feature quantity is maximized, meaning that an edge exists. Otherwise, when the value of $\Delta_{norm}$ is 0, the edge detection feature quantity is minimized, meaning that no edge exists. The value of $\Delta_{norm}$ is between 0 and 1. The closer to 1 the value of $\Delta_{norm}$, the higher the probability that an edge exists. The closer to 0 the value of $\Delta_{norm}$, the lower the probability that an edge exists. In the present exemplary embodiment, the value of $\Delta_{norm}$ serves as the gain coefficient correction value.

In step 307, the gain adjustment unit 104 adjusts high-frequency images by using formula (8).

[Math. 8]

$$H'_{Lv}(x,y) = H_{Lv}(x,y) + C(x,y) \cdot (\alpha_{Lv} - 1) \times H_{Lv}(x,y) \quad (8)$$

where α indicates the value of the gain coefficient specified by the gain coefficient acquisition unit 102, and C indicates the gain coefficient correction value calculated by the gain coefficient correction value calculation unit 103.

For a region which is highly likely to be an edge, the gain coefficient correction value C is close to 1 and therefore high-frequency images will be adjusted based on a value close to the gain coefficient value. For a region which is highly likely not to be an edge, the gain coefficient correction value C is close to 0 and therefore is adjusted with the gain coefficient value reduced. The gain adjustment unit 104 performs high-frequency image adjustment processing by using the gain coefficient α and the gain coefficient correction value C on a pixel basis.

In step 308, the processed image generation unit 105 reconstructs an image based on gain-adjusted high-frequency images H'. Replacing high-frequency images H represented by formula (2) with high-frequency images H' enables generating a gain-adjusted reconstructed image.

In step 309, the image processing apparatus applies post-processing such as geometric conversion and WW (window width)/WL (window level) to the image reconstructed by the processed image generation unit 105. In step 310, the image processing apparatus outputs the processed image to a monitor or memory.

Repeating the above-described processing in steps 304 to 307 for each frequency band enables performing edge detection optimized for each frequency band, and acquiring the gain correction coefficient value according to the result of the edge detection. Using these value enables performing selective frequency emphasis processing immune to noise effects and acquiring an image having a further effect of emphasis while maintaining the user-selected frequency response.

A second exemplary embodiment of the present invention will be described below.

In the first exemplary embodiment, a plurality of edge detection methods has been described as a plurality of methods for calculating the gain coefficient correction value. In the second exemplary embodiment, a method for utilizing a plurality of output results based on an identical detection method will be described below. Image processing according to the second exemplary embodiment will be described below with reference to the block diagram illustrated in FIG. 1 and the flowchart illustrated in FIG. 3. The processing in steps 301 to 304 is similar to the relevant processing in the first exemplary embodiment, and redundant description will be omitted.

In step 305, the gain coefficient correction value calculation unit 103 selects a method of calculating the gain coefficient correction value by using the value of gain coefficient α specified by the gain coefficient acquisition unit 102. As described above, the method for calculating the gain coefficient correction value refers to a method for detecting edge components of high-frequency images and outputting a value for correcting the gain coefficient based on the result of the detection. In the present exemplary embodiment, a plurality of detection sensitivities is provided for one edge detection method and an edge detection sensitivity is selected for each frequency band based on the gain coefficient.

Figure 4B:
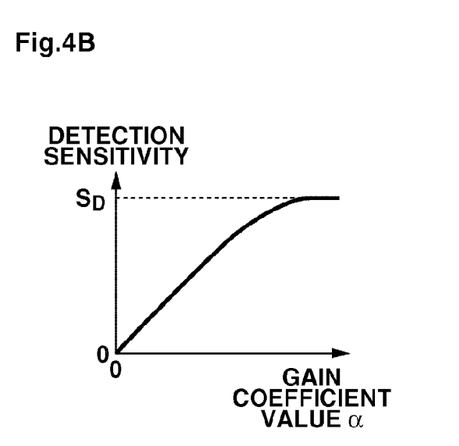

FIG. 4B illustrates an example of a relation between the edge detection sensitivity and the gain coefficient. The edge detection sensitivity indicates the sensitivity for detecting an edge. The higher the edge detection sensitivity, the higher the possibility of recognition as an edge. With higher edge detection sensitivity, on the other hand, pixels other than an edge, such as noise, are more likely to be erroneously recognized as an edge. Accordingly, as illustrated in FIG. 4B, the edge detection sensitivity decreases with decreasing gain coefficient. When the gain coefficient is set to a small value, the dominant frequency band is noise and therefore erroneous recognition is prevented. When the gain coefficient is set to a large value, processing is performed with a predetermined detection sensitivity $S_D$. Alternatively, the gain coefficient may be set to a value larger than the detection sensitivity $S_D$ to enable more minute edge detection.

For example, a case where the moment operator is used as the edge detection method and the edge detection sensitivity is changed will be described below. The edge feature quantity when the moment operator is used is the value of $\Delta_{norm}$ obtained by normalizing the value of $\Delta$, represented by formula (7) in the first exemplary embodiment, in terms of the reference distance $\Delta_{base}$.

As described in the first exemplary embodiment, the reference distance $\Delta_{base}$ is calculated by formula (6) when an edge having the predetermined difference d exists in the local region. The predetermined difference d is a target edge. The ratio of a difference to the reference distance $\Delta_{base}$ indicates the possibility that the difference is an edge. Therefore, the smaller the predetermined difference d, the smaller the target edge setting and the higher the detection sensitivity. With the same value of $\Delta$, the value of $\Delta_{norm}$ increases with decreasing value of the predetermined difference d. This means that the value of $\Delta_{norm}$ is highly likely to indicate an edge. The value of the predetermined difference d can be said to be a parameter which determines the detection sensitivity. As illustrated in FIG. 4B, the detection sensitivity decreases with decreasing gain coefficient. This characteristics can be adjusted by decreasing the value of the predetermined difference d. Also in the present exemplary embodiment, in step 306, the gain adjustment unit 104 sets the value of $\Delta_{norm}$ as the gain coefficient correction value C.

In step 307, the gain adjustment unit 104 adjusts high-frequency images by using formula (8), where a indicates the value of the gain coefficient specified by the gain coefficient acquisition unit 102, and C indicates the gain coefficient correction value calculated by the gain coefficient correction value calculation unit 103. The processing in subsequent steps 308 to 310 is similar to the relevant processing in the first exemplary embodiment, and redundant description will be omitted.

According to the second exemplary embodiment, the frequency emphasis processing for emphasizing edges can be performed without emphasizing noise components, enabling acquiring an image having a further effect of emphasis while maintaining the user-selected frequency response.

A third exemplary embodiment of the present invention will be described below.

In the third exemplary embodiment, as a plurality of methods for calculating the gain coefficient correction value, a second method for utilizing a plurality of output results based on an identical detection method will be described below. Image processing according to the third exemplary embodiment will be described below with reference to the block diagram illustrated in FIG. 1 and the flowchart illustrated in FIG. 3. The processing in steps 301 to 304 is similar to the relevant processing in the first exemplary embodiment, and redundant description will be omitted.

In step 305, the gain coefficient correction value calculation unit 103 selects a method for calculating the gain coefficient correction value by using the value of the gain coefficient α specified by the gain coefficient acquisition unit 102. Correcting the gain coefficient refers to reducing the gain coefficient for pixels other than an edge to selectively apply emphasis processing only to edge components in high-frequency images. Correcting the gain coefficient also refers to reducing the gain coefficient for pixels other than noise to selectively apply suppression processing only to noise components in high-frequency images. Therefore, the method for calculating the gain coefficient correction value refers to a method for detecting edge or noise components in high-frequency images and outputting a value for correcting the gain coefficient based on the result of the detection. In the present exemplary embodiment, different output value correction coefficients are provided for one detection method, and an output value correction coefficient is selected for each frequency band based on the gain coefficient.

For example, a case where the moment operator is used as the detection method and the output value correction coefficient is changed will be described below. The edge feature quantity when the moment operator is used is the value of $\Delta_{norm}$ obtained by normalizing the value of $\Delta$, represented by formula (7) in the first exemplary embodiment, in terms of the reference distance $\Delta_{base}$. The closer to 1 the value of $\Delta_{norm}$, the higher the possibility of an edge. The closer to 0 the value of $\Delta_{norm}$, the higher the possibility of not being an edge, i.e., the possibility of noise. Thus, the gain correction coefficient value C is represented by formula (9):

[Math. 9]

$$C(x,y)=K(\alpha)\cdot\Delta_{norm}(x,y)+(1-K(\alpha))\cdot(1-\Delta_{norm}(x,y)) \quad (9)$$

where K is the detection correction coefficient.

Figure 4C:
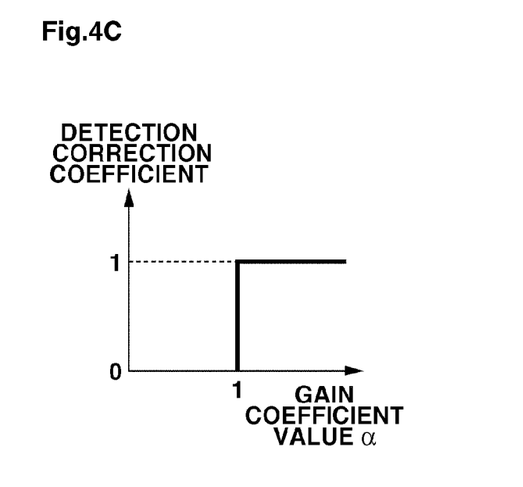

The detection correction coefficient K indicates a step function as illustrated in FIG. 4C. When the gain coefficient value α is 1 or above, K=1. In this case, the value of $\Delta_{norm}$ is used as it is as the gain correction coefficient value C. Otherwise, when the gain coefficient value α is smaller than 1, K=0. In this case, the value of $(1-\Delta_{norm})$ is used as the gain correction coefficient value C. When the gain coefficient value α is smaller than 1, high-frequency image components are suppressed, which serves to prevent noise. In this case, maintaining the gain coefficient for pixels detected as an edge, as with the case where the gain coefficient value α is 1 or above, causes edge suppression resulting in an entirely defocused image. Therefore, in this case, the gain coefficient for noise needs to be increased instead of increasing the gain coefficient for edge.

Therefore, to make the noise detection sensitivity higher than the edge detection sensitivity, the result of the edge detection is inverted to set a large gain coefficient for noise. When the gain coefficient α is smaller than 1, the edge detection method serves as a noise detection method. In the present exemplary embodiment, since a normalized value is used as the feature quantity, there is a relation of 1's complement between the value of first edge information output as an edge detection method and the value of second edge information output as a noise detection method. Although, in the example illustrated in FIG. 4C, the detection correction coefficient is a step function of the gain coefficient α having a threshold value of 1, the detection correction coefficient is not limited to a step function. In step 306, the detection correction coefficient may be a continuously varying function.

In step 307, the gain adjustment unit 104 adjusts high-frequency images by using formula (8), where a indicates the value of the gain coefficient specified by the gain coefficient acquisition unit 102, and C indicates the gain coefficient correction value calculated by the gain coefficient correction value calculation unit 103. The processing in subsequent steps 308 to 310 is similar to the relevant processing in the first exemplary embodiment, and redundant description will be omitted.

According to the third exemplary embodiment, the frequency emphasis processing for emphasizing edges can be performed without emphasizing noise components, enabling acquiring an image having a further effect of emphasis while maintaining the user-selected frequency response.

A fourth exemplary embodiment of the present invention will be described below.

In the fourth exemplary embodiment, as a plurality of methods for calculating the gain coefficient correction value, a third method for utilizing a plurality of output results based on an identical detection method will be described below. Image processing according to the fourth exemplary embodiment will be described below with reference to the block diagram illustrated in FIG. 1 and the flowchart illustrated in FIG. 3. The processing in steps 301 to 304 is similar to the relevant processing in the first exemplary embodiment, and redundant description will be omitted.

In step 305, the gain coefficient correction value calculation unit 103 selects a method for calculating the gain coefficient correction value by using the value of gain coefficient α specified by the gain coefficient acquisition unit 102. Correcting the gain coefficient refers to reducing the gain coefficient for pixels other than noise to selectively apply suppression processing only to noise components in high-frequency images. Therefore, the method for calculating the gain coefficient correction value refers to a method for detecting noise components in high-frequency images and outputting a value for correcting the gain coefficient based on the result of the detection, i.e., noise information. In the present exemplary embodiment, a plurality of detection sensitivities is provided for one noise detection method and a noise detection sensitivity is selected for each frequency band based on the gain coefficient.

Figure 4D:
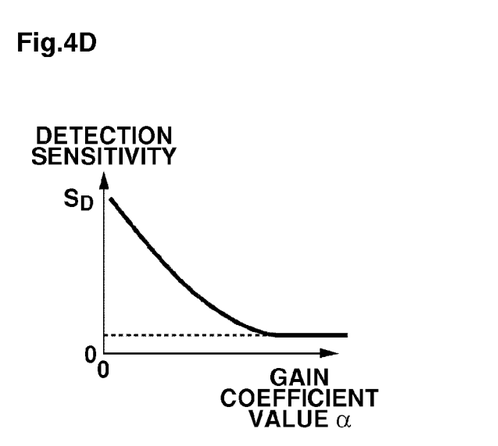

FIG. 4D illustrates an example of a relation between the noise detection sensitivity and the gain coefficient. For example, a case where a method for calculating a variance value is used as the noise detection method and the detection sensitivity is changed will be described below. A noise feature quantity, using a method for calculating a variance value, is obtained by setting a local region on an image as a variance value in the local region, and then theoretically calculating the amount of noise based on an average value in the local region, as described below. Random noise on an X-ray image is represented by the amount of pixel value variation in a specific region irradiated with X-ray dose having a fixed intensity "X". Random noise is classified into two types, which are random quantum noise fluctuating the pixel value with the standard deviation $\sigma_q(X)$ resulting from the X-ray dose "X", and random system noise (electrical noise fluctuating the pixel value with the standard deviation $\sigma_s$) received from a sensor and surrounding electrical circuits. Since the two different types of random noise are added as random noise to the X-ray image, the theoretical amount of noise σ(X) is represented by formulas (10) and (11):

[Math. 10]

$$\sigma(X)=\sqrt{\sigma_q(X)^2+\sigma_s^2} \tag{10}$$

$$\sigma_q(X)=K_q \cdot (X)^{1/2} \tag{11}$$

where X indicates an average value in the local region.

Although the standard deviation $\sigma_q(X)$ changes according to formula (10) depending on the average value X, the standard deviation $\sigma_s$ is a constant value of electric thermal noise not dependent on the X-ray intensity. In formula (11), $K_q$ is a conversion coefficient used to calculate the amount of noise based on the X-ray intensity. As represented by formula (12), when the variance value $\sigma_{img}$ in the local region is smaller than the theoretical amount of noise σ(X), the relevant pixel is detected as noise. In this case, the gain coefficient correction value C is set to 1 to perform noise suppression processing. Otherwise, when the variance value $\sigma_{img}$ in the local region is equal to or larger than the theoretical amount of noise σ(X), the relevant pixel is detected as an edge. In this case, the gain coefficient correction value C is set to 0 not to perform noise suppression processing. When performing the comparison in formula (12), the theoretical amount of noise σ(X) is multiplied by the detection sensitivity $S_D$.

[Math. 11]

When $\sigma_{img} < \sigma(X) \cdot S_D$, C=1

When $\sigma_{img} \geq \sigma(X) \cdot S_D$, C=0 (12)

The detection sensitivity $S_D$ is a function of the gain coefficient α, which indicates the relation illustrated in FIG. 4D.

The detection sensitivity $S_D$ increases with decreasing gain coefficient α. When the gain coefficient α is set to a small value, the dominant frequency band is noise and therefore noise extraction leakage is prevented. When the gain coefficient α is set to a large value, processing is performed with a predetermined detection sensitivity $S_D$. In step 306, the gain coefficient α may be set to a value smaller than the detection sensitivity $S_D$ to prevent excessive noise extraction.

In step 307, the gain adjustment unit 104 adjusts high-frequency images by using formula (8), where a indicates the value of the gain coefficient specified by the gain coefficient acquisition unit 102, and C indicates the gain coefficient correction value calculated by the gain coefficient correction value calculation unit 103. The processing in subsequent steps 308 to 310 is similar to the relevant processing in the first exemplary embodiment, and redundant description will be omitted.

According to the fourth exemplary embodiment, the frequency emphasis processing for emphasizing edges can be performed without emphasizing noise components, enabling acquiring an image having a further effect of emphasis while maintaining the user-selected frequency response.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-020223 filed Feb. 1, 2012, which is hereby incorporated by reference herein in its entirety.

The invention claimed is:

1. An image processing apparatus comprising:
a frequency component generation unit configured to generate a plurality of frequency component images based on an original image;
a coefficient acquisition unit configured to acquire gain coefficients for applying gain correction to at least one of the plurality of frequency component images;
a detection unit configured to detect edge information of the plurality of frequency component images based on the gain coefficients acquired by the coefficient acquisition unit for the plurality of frequency component images;
a gain adjustment unit configured to adjust gain coefficients of the plurality of frequency component images based on the acquired gain coefficients and the edge information; and
a processed image generation unit configured to generate a processed image based on the plurality of frequency component images with the gain coefficients adjusted by the gain adjustment unit.

2. The image processing apparatus according to claim 1, wherein the gain adjustment unit corrects the gain coefficient based on the edge information, and adjusts the gain of the plurality of frequency component images based on the corrected gain coefficients.

3. The image processing apparatus according to claim 2, wherein the gain adjustment unit corrects the gain coefficient such that the gain coefficient corrected based on first edge information and the gain coefficient corrected based on second edge information has a relation of 1's complement.

4. The image processing apparatus according to claim 1, wherein the detection unit detects the edge information of at least one of the plurality of frequency component images by using an edge detection method based on the gain coefficients.

5. The image processing apparatus according to claim 1, wherein the detection unit detects the edge information of at least one of the plurality of frequency component images, and corrects the edge information based on the gain coefficients.

6. The image processing apparatus according to claim 1, wherein, when the value of the gain coefficient is smaller than 1, the detection unit detects the edge information indicating that the edge detection sensitivity is smaller than the noise detection sensitivity based on at least one of the plurality of frequency component images.

7. The image processing apparatus according to claim 1, wherein the detection unit detects the edge information of at least one of the plurality of frequency component images by using a reference value of an edge feature quantity based on the gain coefficient.

8. An image processing method comprising:
generating a plurality of frequency component images based on an original image;
acquiring gain coefficients for applying gain correction to the plurality of frequency component images;
detecting edge information of the plurality of frequency component images based on the acquired gain coefficients;
adjusting gain coefficients of the plurality of frequency component images based on the acquired gain coefficients and the edge information; and
generating a processed image based on the plurality of gain-adjusted frequency component images.

9. A non-transitory computer-readable storage medium storing a computer program that causes a computer to perform an image processing method comprising:
generating a plurality of frequency component images based on an original image;
acquiring gain coefficients for applying gain correction to the plurality of frequency component images;
detecting edge information of the plurality of frequency component images based on the acquired gain coefficients;
adjusting gain coefficients of the plurality of frequency component images based on the acquired gain coefficients and the edge information; and
generating a processed image based on the plurality of gain-adjusted frequency component images.

* * * * *